United States Patent [19]

Anderson

[11] Patent Number: 5,669,123
[45] Date of Patent: Sep. 23, 1997

[54] METHOD OF MAKING A DIMENSIONALLY STABLE PARTICLE-LOADED PTFE WEB

[75] Inventor: Dale R. Anderson, St. Paul, Minn.

[73] Assignee: Minnesota Mining and Manufacturing Company, St. Paul, Minn.

[21] Appl. No.: 681,240

[22] Filed: Jul. 22, 1996

Related U.S. Application Data

[62] Division of Ser. No. 225,464, Apr. 8, 1994, Pat. No. 5,582,892.

[51] Int. Cl.$^6$ .............................. D06C 21/00; B29C 67/00
[52] U.S. Cl. .............................. 26/18.5; 26/18.6; 264/175; 264/282
[58] Field of Search .............................. 26/18.6, 18.5, 26/51; 264/282, 283, 288.4, 289.3, 289.6, 290.2, 120, 122, 127, 175; 428/64.1, 323, 327, 421; 442/417

[56] References Cited

U.S. PATENT DOCUMENTS

| | | |
|---|---|---|
| 1,861,422 | 5/1932 | Cluett. |
| 2,522,663 | 9/1950 | Chatfield ........................ 26/18 |
| 2,721,370 | 10/1955 | Cluett et al. .................. 26/18 |
| 2,765,513 | 10/1956 | Walton ........................ 26/18 |
| 2,765,514 | 10/1956 | Walton ........................ 26/18 |
| 3,100,925 | 8/1963 | Messinger ....................... 26/19 |
| 3,220,056 | 11/1965 | Walton ........................ 18/19 |
| 3,235,933 | 2/1966 | Catallo et al. ................. 26/18 |
| 3,329,562 | 7/1967 | Schaefer ....................... 162/361 |
| 3,336,644 | 8/1967 | Dusenbury et al. ........... 26/18 |
| 3,339,249 | 9/1967 | Libby ........................ 26/18 |
| 3,426,405 | 2/1969 | Walton ........................ 26/18 |
| 3,452,409 | 7/1969 | Trifunovic et al. ........... 26/18 |
| 3,471,907 | 10/1969 | Beckers ........................ 26/18 |
| 3,515,633 | 6/1970 | Futch, Jr. ...................... 162/206 |
| 3,650,867 | 3/1972 | Bauer ........................ 26/18.6 |
| 3,681,819 | 8/1972 | Trifunovic et al. ........... 26/18 |
| 3,810,280 | 5/1974 | Walton et al. ................ 26/18 |
| 3,869,768 | 3/1975 | Walton et al. ................ 26/18 |
| 3,939,537 | 2/1976 | Kreeft et al. ................ 26/18 |
| 3,940,833 | 3/1976 | Troope et al. ................ 26/18 |
| 3,975,806 | 8/1976 | Walton et al. ................ 26/18 |
| 3,978,696 | 9/1976 | Ito et al. ..................... 68/158 |
| 4,050,982 | 9/1977 | Bolliand et al. ............ 162/100 |
| 4,118,179 | 10/1978 | Balliger ....................... 26/18.6 |
| 4,118,841 | 10/1978 | Diggle, Jr. ..................... 26/18 |
| 4,142,278 | 3/1979 | Walton et al. ................ 26/18 |
| 4,153,661 | 5/1979 | Ree et al. .................... 264/120 |
| 4,156,955 | 6/1979 | Joy ........................ 26/18 |
| 4,241,478 | 12/1980 | Nürk ........................ 26/18 |
| 4,432,926 | 2/1984 | Van Tilburg et al. ........ 26/18.6 |
| 4,432,927 | 2/1984 | Van Tilburg et al. ........ 26/18.6 |
| 4,460,642 | 7/1984 | Errede et al. ................ 428/283 |
| 4,562,627 | 1/1986 | Milligan ........................ 26/18 |
| 4,717,329 | 1/1988 | Packard et al. ............... 26/18.6 |
| 4,722,898 | 2/1988 | Errede et al. ................ 435/182 |
| 4,810,381 | 3/1989 | Hagen et al. ................ 210/502 |
| 4,882,819 | 11/1989 | Milligan et al. .............. 26/18 |
| 5,012,562 | 5/1991 | Catallo ........................ 26/18 |
| 5,016,329 | 5/1991 | Milligan et al. .............. 26/18 |
| 5,060,349 | 10/1991 | Walton et al. ................ 26/18 |
| 5,071,610 | 12/1991 | Hagen et al. ................ 264/210 |
| 5,238,621 | 8/1993 | Hagen et al. ................ 264/45 |
| 5,277,963 | 1/1994 | von Blucher et al. ......... 428/206 |
| 5,405,643 | 4/1995 | Scholz ........................ 427/2.31 |

*Primary Examiner*—Amy B. Vanatta
*Attorney, Agent, or Firm*—Gary L. Griswold; Walter N. Kirn; William J. Bond

[57] ABSTRACT

A mechanically compacted composite article comprising a PTFE fibril matrix that entraps particles retains more of its longitudinal dimension, when subjected to mechanical and/or thermal stress, than a similar but non-mechanically compacted article. A method of making a particulate loaded PTFE fibril web is disclosed, the method including biaxial calendaring to form a sheet or sheet laminate, and machanically compacting the sheet or sheet laminate.

10 Claims, No Drawings

METHOD OF MAKING A DIMENSIONALLY STABLE PARTICLE-LOADED PTFE WEB

This is a division of application Ser. No. 08/225,464 filed Apr. 8, 1994 now U.S. Pat. No. 5,582,892.

This invention was made with United States Government support under contract no. DAAK60-89-C-1033 awarded by U.S. Army Natick RD&E Center. The Government has certain rights in the invention.

BACKGROUND OF THE INVENTION

1. Field of the Invention

This invention relates to dimensionally stable composite articles in which polytetrafluoroethylene fibrils entrap particulate. The dimensional stability is imparted by mechanically compacting the composite articles.

2. Description of Related Art

Composite articles in which polytetrafluoroethylene (PTFE) fibrils entrap particulate have been well known for some time. Because these articles hold a large amount of particulate in a relatively small amount of fibrils (i.e., the article can be up to about 98 weight percent particulate), these articles can be thought of as a sheet of particles. Depending on the particles used, such sheets (or shapes cut therefrom) can be used in a wide variety of applications including separations, extractions, reactions, and provision of fouling/corrosion protection to marine structures.

One of the few limitations on these articles is that they tend to shrink, especially in the down-web direction (i.e., the direction of machining). This is believed to be due to the tendency of the PTFE fibrils to return to their original, coiled condition upon application of thermal or mechanical stress. This tendency can result in these articles changing shape during use, e.g., from circular to elliptical.

Eliminating this tendency to shrink without affecting the ability to confine large amounts of particulate within a relatively small area is highly desirable. One approach is set forth in assignee's copending application U.S. Ser. No. 08/179,313 wherein reinforcing means (e.g., screen or scrim) is embedded in the article. Although effective, the reinforcing means can limit the use of the articles to those applications where such a means will not interfere with the desired end use. The production of a dimensionally stable web that does not contain such a reinforcing means is potentially of great value.

SUMMARY OF THE INVENTION

Briefly, the present invention provides a composite article comprising a PTFE fibril matrix with particles entrapped therein, the article having been mechanically compacted so that, upon being subjected to thermal and/or mechanical stress, it retains at least 20% more of its longitudinal dimension than it did upon being subjected to thermal and/or mechanical stress before being mechanically compacted.

In another aspect, the present invention provides a disk, for use in solid phase extraction or reaction applications, that has been cut from a composite article comprising a fibrillated polytetrafluoroethylene matrix and sorptive particles entrapped therein, the article having been mechanically compacted so that the article, upon subjection to thermal and/or mechanical stress, retains at least 20% more of its longitudinal dimension than it did upon being subjected to thermal and/or mechanical stress before being mechanically compacted.

In a still further aspect, the present invention provides a method of making a composite web that is substantially dimensionally stable comprising the steps:

a) providing a web comprising a PTFE fibril matrix with particles entrapped therein; and b) mechanically compacting the web and, optionally, cutting the web to provide an article therefrom.

Unless otherwise indicated, the following definitions will apply in this application:

"mechanical compaction" means the application of mechanical stress to a sheet-like article so as to pre-shrink that article; and "longitudinal compaction" means feeding a sheet-like article, in the same direction as it was last processed during production, into a working zone of a compacting device wherein the velocity of the article as it is fed into the working zone is greater than the velocity of the article as it exits the working zone.

When subjected to thermal or mechanical stress, mechanically compacted particle-loaded fibrillated PTFE webs retain at least 20% more, preferably at least 50% more, and most preferably 75% more, of their longitudinal dimension upon being subjected to thermal or mechanical stress than do untreated webs. Where an article produced from a mechanically compacted particle-loaded PTFE fibril web must undergo strenuous handling or treatment, it tends to retain its initial shape.

The particle-loaded webs of the present invention confine a large amount of particles in a relatively small surface area. They can be thought of as "sheets of particles" since the amount of PTFE can be as low as 2 or 3% (by wt.), although amounts between 5 and 30% (by wt.) are preferred. In use, the PTFE fibrils of the webs are inactive toward the chemical species on which the particles are acting. Nevertheless, by mechanically compacting these webs, they retain more (e.g., at least 20% more) of their longitudinal dimension upon subjection to thermal and/or mechanical stress than do untreated webs. That such an article (i.e., a "sheet of particles") should be less prone to shrink after being mechanically compacted is quite surprising and unexpected. Nevertheless, reduction or even elimination of the tendency of these articles to shrink is observed.

Depending on the particulate used, articles of the present invention can be used in a variety of applications including solid phase extraction, solid phase reaction, and sorption of toxic and/or hazardous materials. Advantageously, those articles with a predetermined shape (e.g., a liner in article of clothing) can be later worn or treated (e.g., cleaned, laundered, etc.) without losing that shape. A dimensionally stable particle-loaded PTFE web without such an embedded reinforcing means is highly desirable.

DETAILED DESCRIPTION OF PREFERRED EMBODIMENTS

To produce the fibrillated PTFE web of the present invention, an aqueous PTFE dispersion is used. This milky-white dispersion contains about 25 to 70% (by wt.) of minute PTFE particles suspended in water. A major portion of these PTFE particles range in size from 0.05 to about 1.5 µm. Commercially available aqueous PTFE dispersions may contain other ingredients such as surfactants and stabilizers which promote continued suspension. Examples of such commercially available dispersions include Teflon 30, Teflon 30B, and Teflon 42 (E.I. DuPont de Nemours Chemical Corp.; Wilmington, Del.). Teflon 30 and Teflon 30B contain about 59 to 61% (by wt.) PTFE solids and about 5.5 to 6.5% (by wt., based on the weight of PTFE resin) of a non-ionic wetting agent, typically octylphenyl polyoxyethylene or nonylphenyl polyoxyethylene. Teflon 42 contains about 32 to 35% (by wt.) PTFE solids and no wetting agent, although it does contain a surface layer of organic solvent to prevent evaporation.

The composite web comprising fibrillated PTFE preferably is prepared as described in any of U.S. Pat. Nos. 4,153,661, 4,460,642, and 5,071,610, the processes of which are incorporated herein by reference, by blending the desired particulate into the aqueous PTFE emulsion in the presence of sufficient lubricant to approach, meet, or preferably exceed the sorptive capacity of the solids yet maintain a putty-like consistency. This putty-like mass is then subjected to intensive mixing at a temperature between 0° and 100° C., preferably between 40° and 100° C., to cause initial fibrillation of the PTFE particles. Thereafter, the putty-like mass is repeatedly and biaxially calendered, with a progressive narrowing of the gap between the rollers, until shear causes the PTFE to fibrillate and enmesh the particulate and a layer of desired thickness is obtained. Removal of any residual surfactant or wetting agent by organic solvent extraction or by washing with water after formation of the sheet article is generally desirable. The resultant sheet is then dried. Such sheets generally have thicknesses in the range of 0.05 to 10 mm, preferably in the range of 0.1 to 1 mm, most preferably in the range of 0.1 to 0.5 mm.

If a web with multiple particulate layers is desired, the component layers themselves are placed parallel to each other and calendered until they form a composite where the PTFE fibrils of the separate layers are entwined at the interface of adjacent sheets. Multilayer webs preferably have thicknesses in the range of 0.1 to 10 mm.

The void size and volume within such a web can be controlled by regulating the lubricant level during fabrication as described in U.S. Pat. No. 5,071,610. Because both the size and the volume of the voids can vary directly with the amount of lubricant present during the fibrillation process, webs capable of entrapping particles of various sizes are possible. For example, increasing the amount of lubricant to the point where it exceeds the lubricant sorptive capacity of the particulate by at least 3% (by wt.) and up to 200% (by wt.) can provide mean void sizes in the range of 0.3 to 5.0 μm with at least 90% of the voids having a size of less than 3.6 μm. This process can be used to create a web with one or more kinds of particles enmeshed therein. The PTFE which forms the web within which particulate is to be trapped can be obtained in resin emulsion form wherein the PTFE and lubricant are already pre-mixed (e.g., Teflon™ 30 or 30B, available from DuPont Corp.). To this emulsion can be added additional lubricant in the form of water, water-based solvents such as a water-alcohol solution, or easily removable organic solvents such as ketones, esters, and ethers, to obtain the aforementioned desired proportion of lubricant and particulate.

Particles of all shapes can be used in such a matrix. Average diameters of particles useful when the matrix comprises PTFE fibrils are within the range of 0.1 to 250 μm, more preferably within the range of 0.1 to 100 μm, and most preferably within the range of 1 to 10 μm. These particles can be of regular or irregular shape. They can even take the shape of rods or whiskers. The enmeshing fibrils retain the enmeshed particulate, by entrapment or adhesion, within the matrix, and the enmeshed particles resist sloughing.

As one skilled in the art will note, a wide variety of particulate meets these conditions and the type of particulate to be used in a given application will depend only on the desired end use of the web. Examples of particulate useful in the present invention include, but are not limited to, those listed in U.S. Pat. Nos. 4,810,381, 5,071,610, and 5,238,621 as well as those species of copper in solid form which are capable of producing aqueous copper ions, such as oxides of copper and copper particles, organotin compounds, zinc salts, encapsulated sodium nitrite, certain amines, combinations of a metal whose oxidation potential is greater than that of iron and a salt of that metal comprising that metal and an appropriate anion (such as zinc/zinc chromate), antibiotics such as oxytetracycline that can be encapsulated (e.g., in polyurea), enzymes that interfere with the ability of marine organisms to attach to marine substrates and that can be covalently bonded to polyazlactone supports such as beads, activated carbon, silica, derivatized silica, intercalated styrene divinyl-benzene, ion exchange resins, chitosan, and chitin. The particulate (or combination of particulate) chosen will depend on the end application. Even fragile materials (e.g., biological cells) can be incorporated into fibrillated PTFE webs by means of the process described above (see U.S. Pat. No. 4,722,898, the teaching of which is incorporated herein by reference), so the scope of particulate theoretically useful in the present invention is extremely broad. Those skilled in the art will recognize which particulate may be useful for a given end use application.

Where an article of the present invention is to be used for sorptive or solid phase extraction or reaction purposes, useful particulate includes activated carbon, silica, derivatized silica, zirconia, derivatized zirconia, intercalated styrene divinylbenzene, ion exchange resins, crown ether ligands bonded through linking groups to inorganic substrates (in the form of particles), chitosan, and chitin. Other useful particles include those that can be coated with an insoluble sorbent material or that can be derivatized to provide an insoluble sorbent layer. Some of the most useful particulate includes activated carbon and derivatized silica. Of the activated carbons, Maxsorb™ high surface area active carbon Kansai Coke & Chemical Co. Ltd.; Amagasaki City, Japan) and Renoves™ M30 activated mesocarbon microbeads (Osaka Gas Chemical Co.; Osaka, Japan) are particularly preferred, especially where the article is to be a protective garment (e.g., one that will be used or worn in an environmentally or toxicologically hazardous area).

Depending on the particular end use, adjuvant particles might also be incorporated in the fibrillated PTFE matrix. Pigment and other adjuvant particles with average diameters in the same ranges as listed previously with respect to active particulate can be included. Representative examples of useful pigments include carbon, copper phthalocyanine, taconite, zinc oxide, titanium dioxide, and ferric oxide. Such pigment particles can be included as part of an otherwise reactive layer or as a separate layer which then can be calendered with reactive layers to form a multilayer composite. Other adjuvants which can be incorporated into the fibrillated PTFE web include silica, diffusion modifiers, bioactivity intensifiers, and ultraviolet radiation blockers. When present, such adjuvants can comprise from more than 0 to 95% (by wt.), preferably from more than 0 to 50% (by wt.), and most preferably from more than 0 to 15% (by wt.) of the sheet article.

The sheet article of the present invention preferably comprises active (i.e., non-adjuvant) particulate in an amount of at least 10% (by wt.), more preferably comprises active particulate in an amount of at least 50% (by wt.), and most preferably comprises active particulate in an amount of at least 70% (by wt.). The sheet article can comprise particulate in an amount up to 97 or 98% (by wt.), although particulate amounts in the range of 90 to 95% (by wt.) tend to produce more stable webs. High active particulate loading is desirable to extend the useful life of the web.

Such highly-loaded webs can be thought of as sheets of particles. A large amount of particulate is confined to a defined area by means of a very small amount of fibrils. In use, the fibrils are inactive toward the chemical species to be acted upon. In other words, the species acts as if it were encountering a large mass of unenmeshed particles rather than a particle-fibril matrix.

Once a fibrillated PTFE web with particulate entrapped therein is made, it is mechanically compacted. This can be accomplished by a variety of means including mechanical crumpling, tumbling, beating, etc. However, the most preferred method is longitudinal compaction. The compacting process can be performed from a few seconds up to several hours or more. The web need not be stretched before it is compacted.

In the longitudinal compaction process, the web is fed longitudinally into a compacting device so that the velocity of the web is greater as it enters the working zone of the device (i.e., where the device intimately contacts the web) than it is as it exits that zone. Any device with this characteristic can satisfactorily treat the above-described webs. Examples of devices and/or processes that will produce this effect include those described in U.S. Pat. Nos. 2,522,663, 2,761,370, 2,765,513, 2,765,514, 3,220,056, 3,235,933, 3,426,405, 3,452,409, 3,681,819, 3,810,280, 3,869,768, 4,142,278, 4,241,478, 4,562,627, 4,882,819, 5,012,562, 5,016,329, and 5,060,349, the teachings of which are incorporated herein by reference.

Two particularly useful processes are those described in U.S. Pat. Nos. 4,882,819 (wherein compaction is accomplished by two rollers) and 5,060,349 (wherein compaction is accomplished by a retarding surface in combination with a roller). In both of these processes, a rough-surfaced feed roller imtimately contacts the particle-loaded PTFE web and controls its speed (i.e., generally from 3 to 61 m/min) as it enters the nip formed by, respectively, the second roller (which turns at a slower velocity—e.g., 5 to 50% slower—than does the feed roller) or the retarding surface (e.g., a fixed rigid or flexible blade). When the web reaches the nip (i.e., the working zone), its velocity suddenly decreases. In other words, the velocity of the web as it leaves the working zone is less than that as it enters the working zone. The loss of momentum of the web as it enters the working zone, in combination with the shear force produced at the conjunction of the feed roller and either the second roller or the retarding surface, is the compacting force that shrink treats the web.

Application of heat to the web before, during, and/or after mechanical compaction can further assist in the preshrinking of the web. The compacting process can be performed at temperatures from 40° C. to 200° C., preferably from 50° C. to 180° C. The length of the compacting process generally remain about the same whether or not heat is used.

Another way to preshrink the web articles of the present invention that involves the application of heat is a method known as "heat-crumple-heat". A sample of predetermined measurement is optionally die-cut from a web. The sample (or the web itself) is heated in a closed oven, e.g., Blue M™ oven (General Signal Corp.; Blue Island, Ill.), set at about 150° C. for about an hour at ambient humidity (i.e., about 40–50% relative humidity) and atmospheric pressure (about 1 atm). The sample is removed and cooled. Next, the sample is crumpled into a tight ball before being smoothed out to an approximately flat state. Finally, the sample is reheated for about an hour at 150° C., as described previously. After cooling, the sample is removed.

The "heat-crumple-heat" process can also be used in conjunction with the aforementioned longitudinal compaction methods.

The mechanical compaction produced by any of these processes results in many changes to the web. Most obvious among these are in the thickness and length of the treated web (i.e., the web gets fatter and shorter). These effects tend to be linked in a way such that the volume of the web is conserved. The width of the web tends to remain about the same after treatment, although some treated webs gain or lose a fraction of their width. Additionally, the volume of the web also remains fairly constant. At least with respect to longitudinal compaction, this latter effect is somewhat surprising because knitted fabrics similarly treated become more dense. This lack of change in density might be due to the particles in the web being so closely packed that they resist any compressive force and do not deform.

Perhaps most important among these changes, however, is reduction in stress stored in the PTFE fibrils. The process used to make the webs creates fibrils by passing the PTFE-particle mixture through repeated nip roll treatments. These passes cause the particles to flow relative to one another, primarily in the machine (i.e., longitudinal) direction. The particles interact with the PTFE fibrils in a manner that causes the fibrils to stretch and be drawn out. As a web is processed in a particular direction, with concomitant caliper reduction, the fibrils are stretched in that direction and increasing amounts of stress are stored in the web. This stress imparts to the fibrils a desire to "pull back" to their pre-machined condition (i.e., shrink) when subjected to mechanical and/or thermal stress.

This tendency to shrink becomes of paramount concern where a strong web is desired such as, for example, the lining of a protective garment with a manufacturing specification that the garment be able to resist water penetration up to a pressure of two atmospheres. The extreme processing necessary to provide a web from which such a lining can be cut imparts a level of stress to the fibrils such that they have an even greater tendency to shrink back to their original form. This can result in unacceptable deformity of the web.

When such a web is mechanically compacted, however, the particles and fibrils rearrange in way so that much (if not most) of the longitudinal stress is relieved. This rearranging probably occurs by both linear and rotational motion of the particles. The relieved stress is believed to be stored in the z-direction fibers. This theory is consistent with the observation that webs tend to increase in thickness after being treated.

A treated web will retain at least 20% more, preferably at least 50% more, and most preferably 75% more, of its longitudinal dimension after being subjected to thermal or mechanical stress than a non-compacted web. This result is surprising because, for most purposes, these webs act as sheets of particles. In other words, the fibrils do no more than hold the particles in place. Mechanical compaction treats the fibrils so that their tendency to retreat to their original shape (i.e., a rolled-up ball) is minimized.

If a "preshrunk" article of a particular shape is desired, it can be cut from a web that has been mechanically compacted. An example of such an article is a disk useful in solid phase extraction and reaction applications that comprises sorptive particulate such as silica, ion exchange resins, or any of the other sorptive particles mentioned previously. Another example is a garment, garment liner, or other portion thereof.

The composite articles (i.e., treated webs) of the present invention are useful in the same applications as are the untreated webs. Some examples include solid phase reaction or extraction media (e.g., disks useful in extraction and separation devices) and catalyst supports. Advantageously, the articles of the present invention retain their shape even after the application of thermal and/or mechanical stress thereto.

Objects and advantages of this invention are further illustrated by the following examples. The particular materials and amounts thereof, as well as other conditions and details, recited in these examples should not be used to unduly limit this invention.

EXAMPLES

Example 1

Preparation of an Activated Carbon-Loaded Web

Using the general procedure described in U.S. Pat. No. 4,153,661, a mixture of 2.39 kg of Teflon™ 30B, a 58.9% solids-in-water emulsion of PTFE (DuPont de Nemours Co.; Wilmington, Del.), was gently stirred into 3.59 kg of 54° C. deionized water. This mixture was added to 7.79 kg wet AX-21 activated carbon (Anderson Development Co.; Adrian, Mich.) in a mixer and the slurry was stirred for about 15 seconds.

The resulting puny-like mass was calendered at a roll speed of 3 m/min between rollers heated to 54° C. and set 5 mm apart. After each pass, the web was folded into three layers and rotated 90° and recalendered. This was done twelve times. Thereafter, the web was passed through takedown rolls with a gap of 3.54 mm. After each pass, the gap was narrowed by about 35% of its width until the web had a thickness of 0.64 mm.

This thin web was cut into 87.6 cm-long sheets. These sheets were placed on each other and the stack was passed through takedown rolls set at 0.7×the thickness of the stack. After each pass, the roll width was decreased to 0.7×of the measured web thickness until a final web thickness of 0.2 mm was attained. This thin web was taken up on a cylindrical roll and dried at 22° C. for about 24 hours.

Example 2

Heat-Crumple-Heat Process

Samples cut from the web of Example 1 were mechanically compacted by a heat-crumple-heat process described hereinbelow.

A number of samples were die-cut by hand using a steel rule die and mallet. The samples were heated at about 150° C., cooled, and measured in both the crossweb and downweb directions. The samples were then hand crumpled and held tightly for about 10 sec and smoothed to an approximately flat state. The samples were then reheated for about an hour at 150° C., cooled, and measured in both the cross-web and downweb directions to give the final shrinkage. The thickness of each sample was also measured.

Example 3

First Type of Longitudinal Compaction

Samples (3.05 m×5.08 m) cut from the web of Example 1 were passed through a Tube-Tex™ C2000 compactor (Tubular Textile Machinery; Lexington, N.C.). Each sample was fed at 4.57 m/min into a working zone where a shoe section fit into the nip between a feed roll and a slower-turning retarding roll. The treated samples then underwent the above-described "heat-crumple-heat" process so as to compare their pre- and post-longitudinal compaction characteristics, the results of which are compiled in Table I. (The percentage of PTFE in each of the samples was 29%.)

TABLE I

| | | | | Treatment with Tube-Tex ™ C2000 Compactor | | | |
|---|---|---|---|---|---|---|---|
| | | AS MADE | | | | AFTER TREATMENT | |
| | | | Downweb | CONDITIONS | | | Downweb |
| Sample No. | Particle loading (g/m²) | Thickness (mm) | length change (%)* | Temp. (°C.) | Roll Speed differential (%) | Thickness (mm) | length change (%)* |
| 1 | 134 | 0.30 | −4.96 | 121 | 30 | 0.33 | −4.2 |
| 2 | 128 | 0.33 | −12.61 | 121 | 30 | 0.33 | −9.0 |
| 3 | 121 | 0.30 | −9.30 | 121 | 30 | 0.30 | −3.9 |
| 4 | 128 | 0.33 | −14.00 | 121 | 30 | 0.33 | −10.9 |
| 5 | 145 | 0.30 | −9.13 | 132 | 40 | 0.38 | 1.0 |
| 6 | 127 | 0.30 | −8.96 | 66 | 40 | 0.36 | −2.2 |
| 7 | 171 | 0.30 | −9.74 | 132 | 50 | 0.46 | 4.4 |
| 8 | 123 | 0.30 | −7.57 | 66 | 50 | 0.30 | −4.4 |

*As measured after the heat-crumple-heat process described above.

The data from Table I show that the heat-crumple-heat process changes, and longitudinal compaction further changes, the way fibrillated PTFE webs react to mechanical and/or thermal stress.

Example 4

Second Type of Shrink Prevention

Using the procedure described in Example 2, untreated samples (3.05 m×5.08 m) were compared with samples that were (1) heat treated by placing the web on a continuous belt, driven at 1.8 m/min, that passed through a 30.5 m oven at 171° C. and then (2) passed at 4.57 m/min through a Micrex™ Microcreper (Micrex Corp.; Walpole, Mass.) where a feed roll (171° C.) carried each sample into a flexible retarder where it was compacted. A comparison of the sample measurements is shown below in Table II. (Each of the percentages is relative to the untreated sample.)

TABLE II

Treatment with Micrex ™ Microcreper

| Sample No. | Change in Length (%)* | | | Change in Width (%)* | | | Thickness | | | Basis Wt. (g/m²) | |
|---|---|---|---|---|---|---|---|---|---|---|---|
| | A | B | C | A | B | C | A | B | C | B | C |
| 1 | −4.93 | −6.67 | −1.16 | 2.03 | 2.61 | 2.61 | 0.28 | 0.36 | 0.39 | 124 | 154 |
| 2 | −10.43 | −8.41 | −1.45 | 2.90 | 1.16 | 1.16 | 0.25 | 0.37 | 0.54 | 150 | 190 |
| 3 | −6.09 | −8.70 | 2.32 | 2.72 | 1.16 | 2.90 | 0.25 | 0.37 | 0.51 | 152 | 200 |
| 4 | −4.64 | −7.54 | 1.74 | 4.35 | 4.06 | 2.90 | 0.22 | 0.37 | 0.47 | 153 | 164 |
| 5 | −8.99 | −10.72 | −4.35 | 4.06 | 3.77 | 3.19 | 0.23 | 0.33 | 0.46 | 103 | 157 |
| 6 | −9.57 | −14.20 | −4.35 | 3.19 | 2.90 | 2.61 | 0.22 | 0.35 | 0.50 | 122 | 190 |
| 7 | −17.68 | −10.72 | −4.35 | 4.64 | 1.74 | 2.61 | 0.23 | 0.34 | 0.56 | 126 | 175 |

*As measured after the heat-crumple-heat process described in Example 2.
A = As made (comparative)
B = After heat treatment
C = After longitudinal compaction As can be seen from both Table I and Table II, webs that have been compacted shrink at least 20% less, preferably at least 50% less, and most preferably at least 75% less, than untreated webs. Some treated webs even expand in the downweb direction.

The high pressure hydrostatic resistance (HPHR) of some of these and other samples was measured both before and after longitudinal compaction. Some increase in the HPHR was observed in most of the samples, although the magnitude of the increases were not so great so as to make the samples unusable for the purposes for which they would typically be used.

Various modifications and alterations which do not depart from the scope and spirit of this invention will become apparent to those skilled in the art. This invention is not to be unduly limited to the illustrative embodiments set forth therein.

I claim:

1. A method of making a particulate loaded fibril web that is substantially dimensionally stable comprising the steps:

a) blending an aqueous dispersion of PTFE particles with solid particulates having an average diameter of from 0.1 to 250 μm;

b) mixing the blend at a temperature of from 0° C. to 100° C. to form a putty-like mass;

c) biaxiially calendaring the putty-like mass in a gap until at least one sheet or sheet laminate is formed having a thickness in the range of 0.05 to 10 mm;

d) drying the sheet or sheet laminate;

e) mechanically compacting only said sheet or sheet laminate.

2. The method of claim 1 further comprising the step of cutting an article from said mechanically compacted sheet or sheet laminate.

3. The method of claim 2 wherein said article is a disk for use in solid phase extraction or reaction applications.

4. The method of claim 2 wherein said article is a garment or a portion thereof.

5. The method of claim 1 wherein said mechanical compaction is performed at an elevated temperature.

6. The method of claim 1 further comprising the step of heating said web at least one of before and after said mechanical compaction.

7. The method of claim 1 wherein said mechanical compaction is longitudinal compaction.

8. The method of claim 7 wherein said longitudinal compaction comprises the steps:

a) intimately contacting said web with a feed roller that, at some point along its path, forms a nip with means for retarding said web;

b) impelling said feed roller toward said retarding means so that said retarding means reduces the velocity of said web and said web is longitudinally compacted.

9. The method of claim 8 wherein said retarding means is a second roller the velocity of which is less than that of said feed roller.

10. The method of claim 8 wherein said retarding means is a fixed rigid or flexible surface.

* * * * *